UNITED STATES PATENT OFFICE.

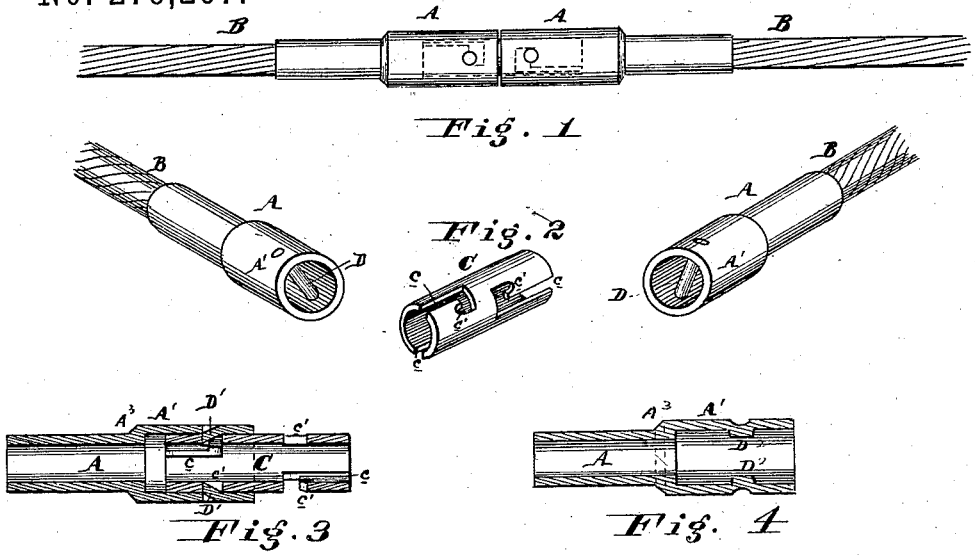

GEORGE W. NOCK, OF PHILADELPHIA, PENNSYLVANIA.

COUPLING FOR BELL-CORDS, &c.

SPECIFICATION forming part of Letters Patent No. 279,267, dated June 12, 1883.

Application filed February 24, 1883. (No model.)

*To all whom it may concern:*

Be it known that I, GEORGE W. NOCK, of the city of Philadelphia, county of Philadelphia, and State of Pennsylvania, have invented an Improvement in Couplings, of which the following is a specification.

My invention has reference to couplings in general; and it consists in certain specific constructions fully set out in the following specification, and shown in the accompanying drawings, which form part thereof.

The object of my invention is to provide cheap and effective means of coupling two rods, bars, or tubes together, and at the same time form an attractive joint, and offering but little obstruction to its passage through orifices—as, for instance, when used to couple the bell-ropes of cars together, in which case the ends of said ropes are provided with the metallic coupling-pieces.

In the drawings, Figure 1 is an elevation of my improved coupling as applied to bell-ropes. Fig. 2 shows the same in perspective and disconnected. Figs. 3 to 7 show modified constructions of same, of which Figs. 3 and 4 are sections and Fig. 7 a perspective, the remaining views being elevations.

A A represent the two metallic coupling-sockets, and are preferably made of stout tubing, having the end expanded, as at A', of slightly larger internal diameter than the external diameter of the original tube. The bell-cords or rods B may be secured in the smaller ends, as shown. The shoulder $A^3$ between the small and enlarged parts of the socket-pieces A is preferably beveled, so as to allow of the coupling being readily drawn through the orifice in the end of the car. Pins D may extend across the enlarged parts A' to form catches for the coupling-piece C. If desired, in lieu of the pins D the sides of the parts A' may be cut and bent in, as shown at D' in Fig. 3, or forced in to form lugs $D^2$, as shown in Fig. 4.

The coupling-piece C is formed of a tube of the same diameter as the small part of the socket-piece A, and has two or four slots, c, terminating in hook-slots c', each of said slots c opening into the end, as shown in Fig. 2.

To couple the two socket-pieces A together the coupling-piece C is inserted into the enlarged end of one of the socket-pieces, the pin, lug, or projection entering the slot c, and, being pressed in as far as it will go, the piece C is turned so as to cause the pin, lug, or projection to pass into the hook part c' of the slot, thus holding the two parts firmly together. Now the other socket-piece A is placed over the projecting end of piece C, and by simply turning the pieces A A are coupled together, as shown in Fig. 1.

If desired, the slots may be made in the socket-pieces, and the coupling-piece may be made with lugs $D^2$, as shown in Figs. 5 to 7, and the socket-pieces A may be strengthened where the slots c are cut by the caps or ribs $A^2$.

This coupling may be used to couple together rods or tubes, cables, or ropes, or driving-bands for machinery, and may be modified in various ways without departing from my invention.

Having now described my invention, what I claim as new, and desire to secure by Letters Patent, is—

1. The two socket-pieces A, having enlarged parts A', and pins, lugs, or projections D, in combination with a coupling-piece, C, having slots c c at each end, and adapted to enter the enlarged parts of the socket-pieces and be wholly inclosed thereby, substantially as and for the purpose specified.

2. The combination of socket-pieces A, having expanded parts A', forming a smooth outer surface, with coupling-piece C, adapted to enter each of said parts A' and to be wholly inclosed thereby, and means to secure said coupling-piece to said socket-pieces, substantially as and for the purpose specified.

In testimony of which invention I hereunto set my hand.

GEO. W. NOCK.

Witnesses:
J. ALFRED SMITH,
WM. MCWADE.